United States Patent

[11] 3,604,995

[72] Inventors Arne Jensen
Als;
Tom Kastrup Petersen, Nordborg, both of Denmark
[21] Appl. No. 755,538
[22] Filed Aug. 27, 1968
[45] Patented Sept. 14, 1971
[73] Assignee Danfoss A/S
Nordborg, Denmark
[32] Priority Aug. 29, 1967
[33] Germany
[31] D 53 958 VIIIb/21c

[54] GENERATOR FOR PRODUCING A WIDTH-MODULATED SQUARE VOLTAGE
10 Claims, 8 Drawing Figs.
[52] U.S. Cl. .................................... 318/341,
307/265
[51] Int. Cl. ........................................... H02p 5/16
[50] Field of Search ........................................... 307/263,
264, 265; 332/9, 10, 17; 318/341; 328/58

[56] References Cited
UNITED STATES PATENTS
3,402,353  9/1968  Hubbs .......................... 307/265
3,440,566  4/1969  Swanson ...................... 307/263

*Primary Examiner*—Oris L. Rader
*Assistant Examiner*—Thomas Langer
*Attorney*—Wayne B. Easton

ABSTRACT: Apparatus producing a width modulated square wave for use in a motor control circuit controlling the speed of an alternating-current motor. A low frequency three-phase generator with stationary components develops three wave outputs integrated and summed with a high frequency wave signal, in a summation circuit, produced by a frequency generator. The sign of the outputs of the summation circuit is ascertained by zero level detectors and employed for controlling the motor speed. A direct-current control voltage is applied to the apparatus to control the amplitude of the high and low frequency waves.

GENERATOR FOR PRODUCING A WIDTH-MODULATED SQUARE VOLTAGE

This invention relates generally to wave generators and more particularly to a generator for producing a width-modulated square voltage, used in particular for controlling the speed of alternating-current motors, in which the width-modulated square voltage is obtained from a signal at a low frequency and one at a higher frequency.

A wave generator is known in which a square wave voltage is obtained from the intersections of a constant frequency, constant amplitude triangular voltage at high frequency and a variable frequency, variable amplitude sinusoidal voltage at low frequency. The frequency and the amplitude of the sinusoidal voltage are proportional in this case. The resulting square voltage has constant amplitudes and may thus be taken from a direct current voltage source, for example, but corresponds nevertheless to the aforementioned sinusoidal voltage as regards repetition frequency and the given mean voltages However, difficulties are encountered with low frequencies when the amplitude of the sinusoidal voltage is small and many intersections occur immediately adjacent zero level. Even small irregularities (temperature variations) in the circuit in which the low-frequency and higher-frequency signals are compared will produce a useless or, at least, strongly falsified result. With high frequencies the amplitude of the low-frequency signal may exceed that of the higher-frequency signal, so that intersections, and thus width modulation, may partly be lost altogether. Furthermore, it is not easy to simultaneously impart to the sinusoidal voltage a variable frequency and a variable amplitude either of which are meant to conform to a predetermined interdependence.

A principal object of the present invention is to provide a wave generator for producing a width-modulated square wave voltage generated from a lower and a higher-frequency signal and which still operates accurately even when the frequency of the low-frequency signal assumes extreme values and which allows setting of amplitude and frequency of the desired square wave voltage with greater freedom than hitherto possible.

This is possible according to the invention, in that the low-frequency signal is of a constant amplitude but of a variable frequency and, in the case of motor control, the low-frequency signal offsets the width-modulated square wave voltage to determine motor speed, and in that the higher-frequency signal, also used in the wave generation of the invention, is of constant repetition frequency but of variable amplitude or slope and, in the case of motor control, offsets the width-modulated signal to determine the motor supply voltage. In this type of generator the amplitude of the low-frequency signal is preserved. Therefore, operating conditions under which the points of intersection of the lower-frequency signal with the higher-frequency frequency signal would predominantly be within the zero-level region cannot occur. Besides, the two variable parameters (frequency and amplitude) are each allocated to one of the two signals. As a result the modulation of the signals is greatly simplified and, above all, the variation of frequency independently of amplitude, and vice versa, becomes possible. Consequently, both the frequency and the voltage level of the width-modulated square wave can be much better controlled than hitherto. the amplitude of the higher-frequency signal is supervised separately, it is possible to ensure that this amplitude is always higher than the amplitude of the low-frequency signal.

The two signals are preferably applied separately to a summation network in series with a zero-level detector ascertaining the sign of the summation voltage and preferably operating with high amplification. The zero-level detector can, therefore, deliver the desired square wave voltage directly. Obviously, some other equivalent circuit element may be provided, for example, a Schmitt trigger. Another signal, corresponding to a midpoint shift of the connected load, may be additionally applied to the summation network. In this way the zero-level can be accurately fixed, so that the intersections of the higher frequency and the low-frequency signals accurately maintain the correct distance from the zero or base line.

When applied to a control circuit for a three-phase motor, the generator should have three outputs for width-modulated square wave voltages which occupy the correct phase position. It is advisable to obtain the low frequency signal from the three-phase generator which has a summation network connected to each of its three phases, while employing a single phase, higher-frequency signal and feeding the latter signal to all three summation networks in common.

In a preferred embodiment of the invention, both signals are produced by integrating square waves the amplitudes of which are variable by means of a direct-current voltage or direct current. This type of control is possible because each signal is influenced only by one variable factor. Integration produces signals of varying slope, exploitable for amplitude control as well as frequency control.

Thus, for example, the half-waves of the low-frequency signal may be trapeziums or trapezoidal waveforms with variable slopes. All the straight sections of the trapeziums having a duration of 60 electrical degrees. This trapezoidal-shaped wave is of particular advantage for a three-phase system because the sum of the instantaneous voltages is always zero. The trapezium waveform approaches a sinusoidal characteristic sufficiently closely to avoid the third harmonic. Considering the fact that identical durations are specified for the three straight sections of the trapezium waveform in conjunction with the amplitude remaining constant, any variation of slope must immediately produce a variation of frequency. Moreover, such a trapezoidal characteristic can easily be produced with stationary electric components. Furthermore, the half-waves of the higher-frequency signal may be basically triangular with variable slope but constant repetition frequency. In view of its constant frequency, any variation of the slope of this signal must immediately vary its amplitude.

Since it is not necessary, in order to obtain intersections with the triangular waves, to modulate these waves fully, it seems advisable to limit the amplitude of the triangular basic wave to a value substantially equivalent to the constant amplitude of the low-frequency signal. Thus the voltage corresponding to the peak of the triangle need not even appear in the system. In cases in which it is possible for the slope of the higher-frequency signal to become so flat that the amplitude falls below the amplitude of the low-frequency signal, a signal with steeper edges can always be superimposed upon the triangular basic wave in the amplitude region. The width of this superimposed signal should preferably not fall below a predetermined value where the slope of the basic wave decreases below a predetermined minimum value. This ensures that two well-defined points of intersection with the low-frequency signal will be obtained even in the least favorable case.

A particularly simple control arrangement is achieved when both signals are variable in dependence on one and the same control direct-current voltage. In particular, the low-frequency signal may be rendered variable in directly proportional manner, and the higher-frequency signal in inversely proportional manner and the higher-frequency signal in inversely proportional manner by means of one and the same direct-current voltage. In this way the repetition frequency of the square voltage as well as its maximum mean value vary in proportion with one another, and this results in a form of motor control whereby torque remains constant even with varying speed.

In this case the direct current control voltage may be directly applied to the control input of the generators for the low frequency and higher-frequency frequency signals. Another embodiment provides for a slope detector to be arranged at the output of the generator producing the higher-frequency signal. The slope-dependent direct-current voltage at the output of this detector is compared with the DC control voltage in an error detector and the resulting voltage is used to control the above-mentioned generator. The feedback used in this arrangement serves the formation of a reciprocal value of maximum accuracy. In other arrangement the DC control voltage is only applied to the generator producing the higher-frequency signal; the latter is followed by a slope detector and the direct-current voltage appearing at the output of this detector is used to control the generator which produces the low-frequency signal.

A slope detector may be a device, for example, which, at a predetermined level—preferably at the level of the constant amplitude of the low-frequency signal—measures the distance between the two slopes of the high-frequency signal and delivers an DC signal proportional to this distance. This task may be performed by a circuit arrangement, for example, in which the unaltered higher-frequency signal is applied to the base of a first transistor while the same signal, chipped at the predetermined level, is applied to the emitter of this transistor and in which the direct-current voltage component of this signal is obtained from the resulting differential signal through a filter network. If necessary after amplification, this component is finally applied to the regulating transistor of a direct-current circuit which delivers the desired control signal.

In a preferred embodiment the summation network adds the signal currents, for example, by applying the outputs outputs of the generators producing the low frequency and the higher-frequency signals to a common impedance through a large ohmic resistance in each case of which at least one of the resistors may be variable. This current addition enables the points of intersection to be obtained without any reaction on the rest of the circuit. Adaptation to different amplitudes in such an arrangement is possible by linear networks.

Other features and advantages of the wave generator in accordance with the present invention will be better understood as described in the following specification and appended claims, in conjunction with the following drawings in which:

Figure 1:
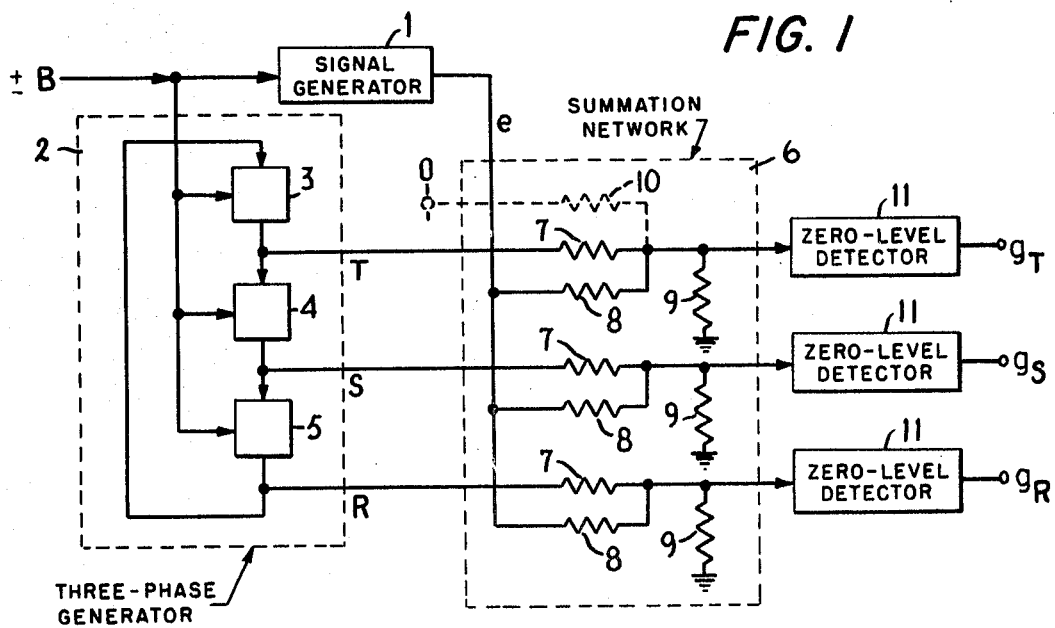
FIG. 1, is a block diagram of a generator according to the invention.
Figure 4:
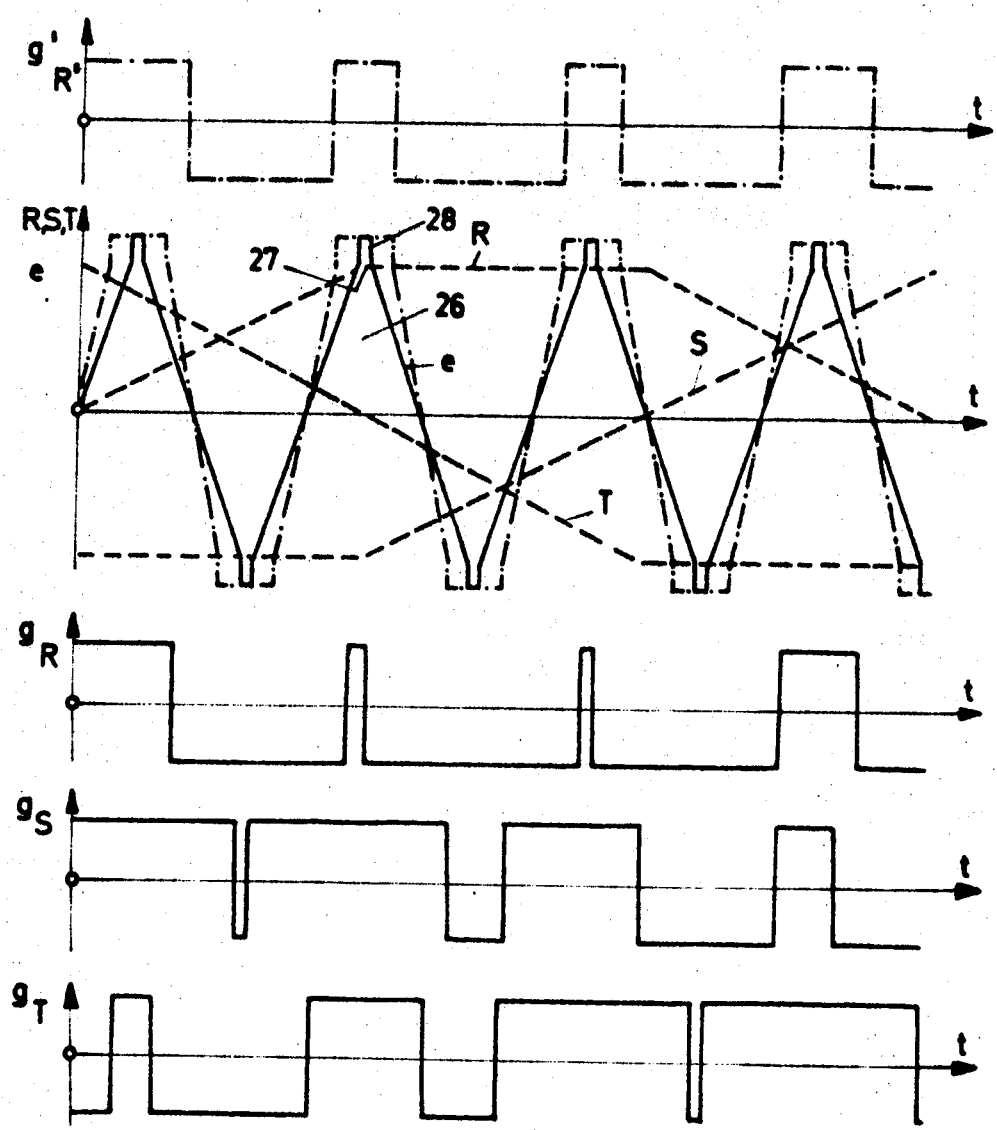
FIG. 4, is a waveform diagram illustrating the characteristics of the higher-frequency signal, the low-frequency signals and the relevant square wave voltages in three-phase operation.

FIG. 1 illustrates a generator 1 producing a higher-frequency signal $e$ of constant frequency the amplitude of which is however variable by means of a control voltage $\pm B$, and a three-phase generator 2 producing low-frequency signals R,S, T of constant amplitude and of a frequency variable by means of the control voltage $\pm B$. The three-phase generator 2 comprises three wave-generating units, 3, 4, 5 of identical construction, series connected in cascade in a loop. The low-frequency signals R, S, T are applied to a summation network 6 in which each of these signals is added to the higher-frequency signal $e$. In order to do this the signals in each case are applied to sets of resistors 7 and 8 respectively and are them applied to common impedances 9. A resistor 10 may also be provided in each case if necessary (only one of these resistors is illustrated in the drawing the other are similarly connected to the respective junctions of the respective pair of resistors 7, 8, and to a zero-level level voltage) and another signal, dependent on the zero-level shift in the load system, would then be added. The sums of the signals are applied to zero-level detectors 11 capable of high amplification, the outputs of which make available width modulated square wave signals $g_R$, $9_S$, $9_T$. As illustrated in FIG. 4 the zero-level detectors function to produce a square wave by switching from one output potential to another each time the difference between the signal $e$ and one of the signals R,S or T, attains a "zero-level."

Figure 2:
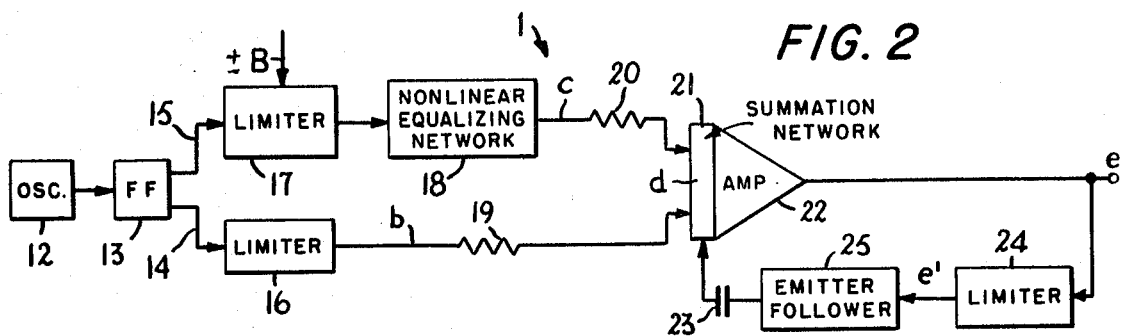
FIG. 2, is a block diagram of an associate generator producing a higher-frequency signal.
Figure 3:
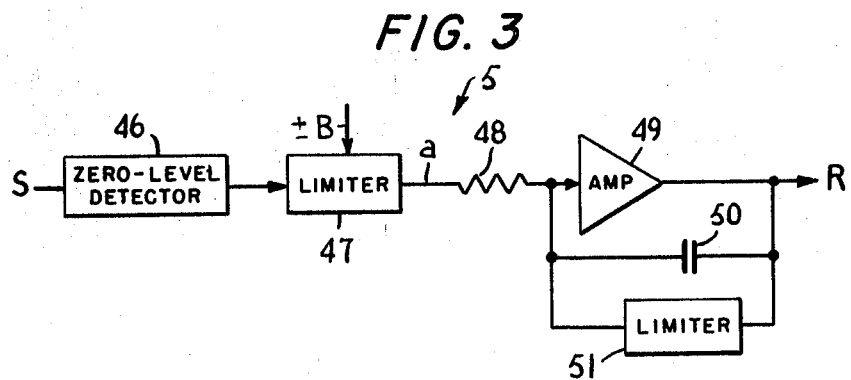
FIG. 3, is a block diagram of a unit in the associate generator producing low-frequency signals.

An embodiment for a generator 1 producing the higher-frequency signals of triangular shape is illustrated in FIG. 2. An oscillator 12 generates pulses, for example at a frequency of 2,000 Hz. or cycles per second. These drive a flip-flop or bistable multivibrator 13 such that a positive and a negative direct-current voltage alternate at its output lead 14, whereas the same voltage appears at another of its output leads 15 with a 180° phase displacement. A double-ended limiter 16 keeps the amplitude of the first-mentioned voltage at a constant level, a constant frequency and constant amplitude square voltage $b$ is the result. In a control circuit or limiter circuit 17 also the output signals on the lead 15 are clipped at a predetermined amplitude proportional to the control signal B. The clipped signals are applied to a nonlinear equalizing network 18 from which a constant frequency, variable amplitude square wave $c$ is obtained. The signals $b$ and $c$ are applied to resistors 19 and 20 respectively to a summation network 21 in which they are subtracted from one another, due to their phase displacement. The equalizing network 18 functions to produce its signal $c$ at a level whereby differential signal $d$ is approximately proportional to the reciprocal value of the control voltage B. Thus, to perform this function, the network 18 must be nonlinear since the signal $b$ is a constant. The signal $d$ likewise represents a constant frequency square wave, is integrated by means of an amplifier 22 and an integrating capacitor 23 included in a feedback circuit, so that a triangular signal $e$ results. The feedback circuit also includes a limiter 24 and an emitter followed 25. This ensures that the triangular signal $e$ is clipped at a level predetermined by the limiter 24. Finally, a steep-edged signal, the amplitude of which is determined by the full modulation of the amplifier 22, is superimposed on the signal $e'$ thus limited, in the region of the latter's clipped amplitude. This steep-edged signal is superimposed by synchronously adding a suitable square wave to the signal $e$ FIG. 3, is block diagram of the unit 5 of the three-phase generator 2 producing a low-frequency trapezoidal voltage R. It will be understood that the other units 3, 4 of the three-phase generator 2 are similarly constructed. The output S of the preceding unit 4 is applied to a high-amplification zero level detector 46. Its output signal is a square wave. The amplitude of this wave is varied in proportion with the control voltage B in a limiter circuit 47. The output signal $a$ of the limiter 47 is thus a square wave of variable amplitude. This signal $a$ is applied through a resistor 48 to an amplifier 49 shunted by an integrating capacitor 50. In parallel with the capacitor is connected a limiter 51 consisting for example, of two Zener diodes, series-connected back to back and fixing the amplitude of the low-frequency signal. As a result of the loop or cascade arrangement, the three units 3–5 affect one another in such a way that in each trapezoidal half-wave the duration of the straight sections correspond to 60 electrical degrees. Therefore, if the slopes of the three signals are varied simultaneously by means of the control voltage B, an instantaneous by means of the control voltage B, an instantaneous frequency variation can be obtained.

In the second line of FIG. 4 the higher-frequency voltage $e$ is shown by the solid line and the three phases R, S, T of the low-frequency voltage are shown by dotted lines. To facilitate the representation of the points of intersection, signal $e$ has been displaced through 180° in the drawing. It should also be noted that the frequency of signal $e$ is much higher than indicated in the drawing. As an example it has a frequency of 1,000 Hz. or cycles per second as against a frequency of 5 to 95 Hz. or cycles per second in in the case of the low-frequency signals.

By following the points of intersection of the higher-frequency signal and the low-frequency signals the crossovers of the width-modulated square voltages $g_R$, $g_S$ and $9_T$ are obtained which are illustrated in the third to fifth lines of FIG. 4.

By varying the slope of the higher-frequency signal e—see the dash-dot characteristic in the second line of FIG. 4—a square voltage is obtained for the phase R—see the dash-dot characteristics in the first line of FIG. 4. It is immediately apparent that an increase in the slope leads to a decrease of the mean values of the width-modulated square voltage. In the same way as a variation of the higher-frequency signal enables the mean value of the square wave to be varied, a frequency variation of the low frequency signal R, S, T will alter the mean value of the square voltage g.

In FIG. 4, the rising slope, or leading edge section, the clipped amplitude section and the falling slope or trailing edge section of each low-frequency trapezoidal half-wave each corresponds to an electrical angle of 60°. It also becomes apparent that the higher-frequency signal e exploits only a base portion 26 of the triangular voltage and is clipped at a level 27 which corresponds to the amplitude of the low-frequency signal. Superimposed on this lower portion is a square wave signal 28 which ensures that a point of intersection with the low-frequency signal is obtained at any rate. The square voltage 28 has a minimum width, so that two clearly distinguishable points of intersection are obtained even under the most adverse conditions.

If it is desired that the torque of a motor should be independent of frequency, then the frequency and the supply voltage of the controlled motor should be proportional to one another. In a generator such as proposed by the present invention this means that the control signal ±B must vary the amplitude of the square wave responsible for the slope of the low-frequency signal inversely proportional to the amplitude of the square responsible for the slope of the low-frequency signals. This can be done by arranging for an appropriate transformation to take place in the generator 2 for the low-frequency signals, see FIG. 3. Other possibilities will be discussed with reference to FIGS. 5 to 8, in which reference numerals corresponding to those in the embodiments before described refer to similar elements.

Figure 5:
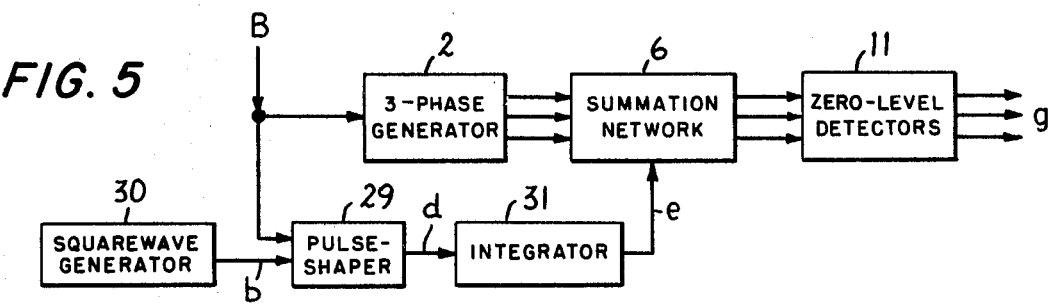
FIG. 5, is a block diagram of a first embodiment of a common control arrangement or system for the generators producing the low frequency and the higher-frequency signals.

In the embodiment of FIG. 5 the signal B is applied directly to the three-phase generator 2 and also a pulse shaping device 29. The latter receives from a square wave generator 30 which may be represented, for example, by the units 12, 13 and 16 of FIG. 2, a square wave signal b of constant frequency and amplitude. The amplitude is multiplied with the reciprocal value 1/B in the pulse-shaping network 29. The output signal d of the pulse shaper 29 is integrated in the unit 31 consisting, for example, of the units 22 to 25 of FIG. 2, and the resulting output signal e is applied to the summation network 6 and zero-level detectors 11.

Figure 6:
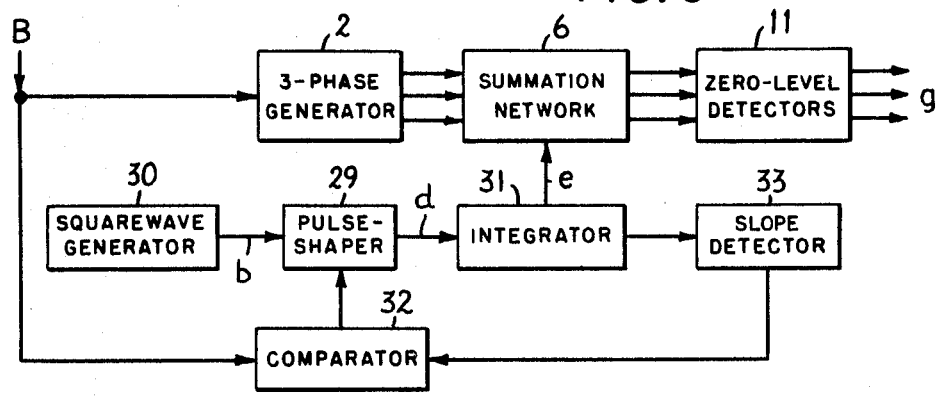
FIG. 6, is a second embodiment of a control system of FIG. 5.

In the embodiment of FIG. 6 the circuit arrangement of FIG. 5 is still further improved in that a comparison circuit or comparator 32 is linked through a slope detector 33 later herein described, to the integrating circuit 31 in a feedback loop. Since the is a function of the control voltage B, the signal transmitted by the comparison circuit 32 continues to be corrected until the slope of the signal e corresponds to the control voltage B. Since the slope and the control voltage B vary proportionally, the feedback signal can be directly compared with the input control voltage B. The correct slope will have been attained when a zero signal appears at the output of the comparator 32.

Figure 7:
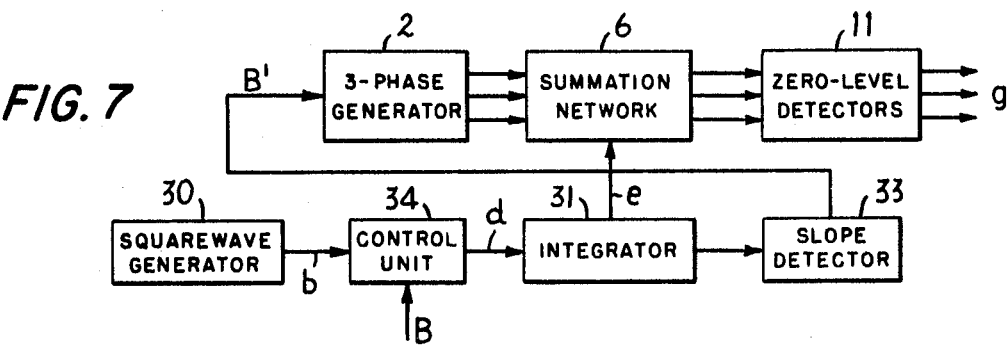
FIG. 7, is a third embodiment of a control system of FIG. 5.

In the embodiment shown in FIG. 7 the control voltage B is merely applied to a control unit 34 of the generator producing the low-frequency signals. The corresponding control signal B' for the three-phase generator 2, on the other hand, is determined by measuring the slope of the signal e by means of the slope detector 33. This has the advantage, first of all, that the frequency of the generator 2 is directly linked to the slope of the signal e fed to the summation circuit 6 and also that a reciprocal value can automatically be produced by this circuit arrangement, i.e. $B' = 1/B$.

Figure 8:
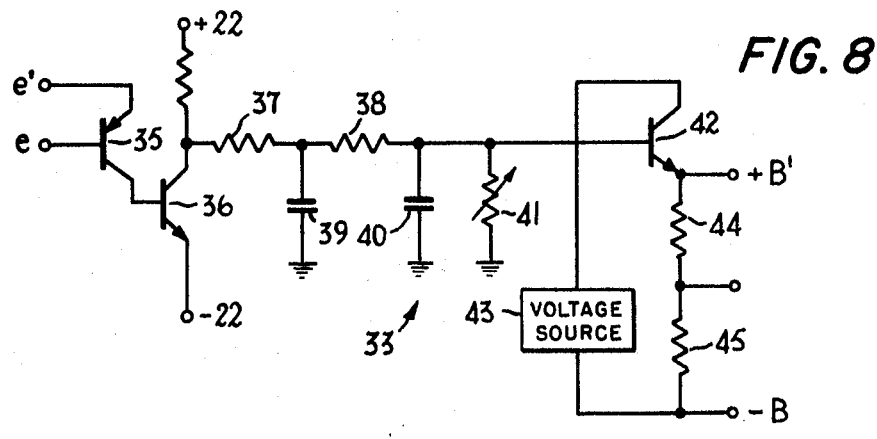
FIG. 8, is a circuit diagram of a slope detector according to the invention.

A slope detector circuit suitable for the unit 33 is illustrated in FIG. 8. The unchanged higher-frequency signal e is applied to the base of a first transistor 35, the signal consisting of the base portion 26 and the square wave 28. A signal e' comprising only the base portion 26 is applied to the emitter of this first transistor 35. As FIG. 2 shows, both signals are available in this circuit arrangement. The resulting differential signal is amplified in a second transistor 36. A filter network comprising the resistors 37, 38 the capacitors 39, 40 and a variable impedance 4 recovers the DC component which is applied to the base of a transistor 42. This transistor is supplied from a voltage source 43 and comprises in its emitter circuit two resistor 44 and 45 across which the voltage +B' and −B' can be derived by means of which a double-ended limiter arrangement in the three-phase generator 2 can be controlled directly.

If, in FIG. 7, the square wave is integrates with the amplitude modified by B, then the signal e has a slope proportional to the value B. The transistor 35 conducts whenever the signal e is greater than the signal e'. The longer this transistor conducts, the flatter the slope of signal e. It can be shown that the DC mean value of the differential signal produced by the output transistor 35 is precisely inversely proportional to the slope of signal e and can therefore be directly used, after amplification and filtering, as the control signal B'to for the three-phase generator 2.

Those skilled in the art will recognize that since the waves generated are plus and minus going waves the control signal B has a plus and a minus polarity. The control signal B is a direct current voltage signal which may be developed, for example, in a motor control circuit, not shown, by a voltage divider across two direct current sources of different polarities. The generators can be connected in such a control circuit and the outputs $9_T$, $9_S$ $9_R$, applied to control elements in the motor control circuit such as trigger means controlling switches applying the outputs to the three phases of the motor or a single phase to maintain the motor speed constant. The variations in the direct control voltage will vary the amplitude of the signals generated by the generators as before described.

Furthermore, as to the superimposed signal above described it can be generated by interrupting the feedback of the integrating circuit or by making it ineffective, by the limiter in the feedback circuit, when a predetermined signal voltage has been attained. The amplifier will then immediately assume a condition of full modulation, i.e. the base portion of the triangular signal attains the level of the predetermined signal voltage and the square wave signal 28 is superimposed. This ensures that the predetermined level or amplitude of the triangular voltage or waves is always exceeded by a safety margin.

While preferred embodiments of the invention have been shown and described it will be understood that many modifications and changes can be made within the true spirit and scope of the invention.

We claim:

1. Apparatus for producing a width-modulated square wave for controlling the speed of alternating-current motors comprising, first generator means for generating a low frequency first signal defining an alternating-current wave having trapezoidal shape in which each half cycle is divided into three equal time regions, said low-frequency signal having a constant amplitude and a variable frequency second generator means generating a higher frequency second signal having a constant repetition frequency and varying amplitude, and defining an alternating current wave in which each half cycle defines a triangle; and means to receive the first and second signal and develop therefrom a width-modulated square wave voltage.

2. The invention as set forth in claim 1, in which said first generator means for generating a low-frequency signal comprises a three-phase generator including three identical units coupled together in a cascade arrangement, and each having an output conductor each said unit comprising zero-level detector means having an output conductor and having an input conductor coupled to the output conductor of the just preceding unit in said cascade arrangement, limiter means having a first input conductor coupled to the output conductor of its corresponding zero-detector means, said limiter means having a signal output conductor and a second input conductor for connection to a control signal for varying the signal output amplitude therefrom, and integrating circuit means for integrating the output of said limiter means to generate said wave defining a trapezoid at said integrating circuit means of each said unit.

3. The invention as set forth in claim 1, in which said second generator means for generating a higher frequency comprises an oscillator having a output terminal, a flip-flop connected to said output terminal of said oscillator and having two output terminals producing signals out of phase with each other, two parallel limiters connected respectively to said two output terminals, each said limiter having an output conductor, an integrating circuit means connected to said two limiter output conductors for summing and integrating the limiter outputs and developing therefrom triangular waves corresponding to said second signal.

4. The invention as set forth in claim 3, in which said integrating circuit means comprises means including an amplifier for superimposing on peaks of said second signal trianglar waves a steep-edged signal of shorter duration than each triangular half cycle.

5. Apparatus according to claim 1, including means to apply a direct current voltage of plus and minus polarity to said first and said second generator means for varying the frequency of the low-frequency signal proportionately to the value of said direct-current signal and varying the amplitude of the higher-frequency signal inversely proportional to the value of said direct-current signal.

6. Apparatus according to claim 1, including means to apply a direct-current voltage of plus and minus polarity to said first generator means to vary the frequency of the low frequency signal proportionately to the value of said direct-current signal.

7. Apparatus according to claim including 1, in which said second means comprises a square wave generator and an integrator connected in series combination with said square wave generator, said series combination being connected in parallel with said first generator means, and said integrator having an output conductor, and in which said first generator means comprises a three-phase generator for generating three-phase outputs, a summation network having said three phase outputs connected thereto, means applying the output conductor of the integrator to each phase output received in said summation network, and a zero-level detector for each phase connected respectively in series with said summation networks.

8. Apparatus according to claim 1, in which said first generator means comprises a three-phase generator having three output conductors, and in which said second generator means comprises a square wave generator and an integration circuit connected in series combination, said combination being connected in parallel with said three-phase generator, and a summation network connected to said three-phase generator for adding the output of said integrator to each output conductor of the three-phase generator, and means to apply a direct-current control signal of plus and minus polarity to said three-phase generator for controlling the amplitude of the outputs of the three-phase generator.

9. Apparatus according to claim 8, comprising a slope detector having said integrator output conductor connected thereto for developing a direct-current control signal, to said first generator means to vary the frequency of the low frequency signal proportionately to the value of said direct-current signal.

10. Apparatus according to claim 9, including a control circuit connected between said integrator and said square wave generator in series therewith said control circuit having means for receiving a control signal corresponding to said direct-current control signal.